US009633007B1

United States Patent
Brun et al.

(10) Patent No.: US 9,633,007 B1
(45) Date of Patent: Apr. 25, 2017

(54) LOOSE TERM-CENTRIC REPRESENTATION FOR TERM CLASSIFICATION IN ASPECT-BASED SENTIMENT ANALYSIS

(71) Applicant: Xerox Corporation, Norwalk, CT (US)

(72) Inventors: Caroline Brun, Grenoble (FR); Julien Perez, Grenoble (FR); Claude Roux, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/079,883

(22) Filed: Mar. 24, 2016

(51) Int. Cl.
G06F 17/27 (2006.01)
G06F 17/30 (2006.01)
G06F 15/00 (2006.01)

(52) U.S. Cl.
CPC ........ *G06F 17/2785* (2013.01); *G06F 17/277* (2013.01); *G06F 17/2715* (2013.01); *G06F 17/30958* (2013.01)

(58) Field of Classification Search
CPC ........... G06F 17/2785; G06F 17/30958; G06F 17/277; G06F 17/2715; G06F 17/30705; G06F 17/30882; G06F 17/3089
USPC ............................................ 704/9, 226, 231
See application file for complete search history.

(56) References Cited

U.S. PATENT DOCUMENTS

| 6,263,335 B1 | 7/2001 | Paik et al. |
| 6,311,152 B1 | 10/2001 | Bai et al. |
| 6,975,766 B2 | 12/2005 | Fukushima |
| 7,058,567 B2 | 6/2006 | Aït-Mokhtar et al. |
| 7,171,350 B2 | 1/2007 | Lin et al. |
| 2008/0319978 A1 | 12/2008 | Brun |
| 2009/0204596 A1 | 8/2009 | Brun et al. |
| 2010/0082331 A1 | 4/2010 | Brun et al. |
| 2011/0099052 A1 | 4/2011 | Brun et al. |
| 2012/0245923 A1 | 9/2012 | Brun |
| 2012/0245924 A1 | 9/2012 | Brun |
| 2013/0096909 A1 | 4/2013 | Brun et al. |
| 2013/0097174 A1 | 4/2013 | Polanyi et al. |
| 2013/0218914 A1 | 8/2013 | Stavrianou et al. |

(Continued)

OTHER PUBLICATIONS

U.S. Appl. No. 14/569,899, filed Dec. 15, 2014, Caroline Brun, et al.

(Continued)

*Primary Examiner* — Thierry L Pham
(74) *Attorney, Agent, or Firm* — Fay Sharpe LLP (57) ABSTRACT

A method for aspect categorization includes receiving an input text sequence and identifying aspect terms and sentiment phrases in the input text sequence, where present. For an identified aspect term, identifying sentiment dependencies in which the aspect term is in a syntactic dependency with one of the identified sentiment phrases, and identifying pseudo-dependencies from a dependency graph of the input text sequence. The dependency graph includes a sequence of nodes. In a pseudo-dependency, a node representing the aspect term precedes or follows a node representing a semantic anchor in the dependency graph without an intervening other aspect term. Features for the aspect term are extracted from at least one of identified sentiment dependencies and identified pseudo-dependencies. With a classifier trained to output at least one of category labels and polarity labels for aspect terms, classifying the identified aspect term based on the extracted features.

20 Claims, 5 Drawing Sheets

(56) References Cited

U.S. PATENT DOCUMENTS

2014/0067370 A1    3/2014    Brun
2014/0163951 A1    6/2014    Nikoulina et al.
2015/0120788 A1    4/2015    Brun et al.

OTHER PUBLICATIONS

Aït-Mokhtar, S., et al., "Robustness beyond Shallowness: Incremental Dependency Parsing," Special Issue of Natural Language Engineering Journal, vol. 8 (2/3), pp. 121-144 (2002).
Brun, C., "Detecting Opinions Using Deep Syntactic Analysis," Proc. Recent Advances in Natural Language Processing (RANLP), pp. 392-398 (2011).
Brun, C., et al., "XRCE: Hybrid Classification for Aspect-based Sentiment Analysis," Proc. 8th Int'l Workshop on Semantic Evaluation (SemEval 2014), pp. 838-842 (2014).
Brun, C., et al., "Normalization and paraphrasing using symbolic methods," ACL: 2nd Int'l Workshop on Paraphrasing, Paraphrase Acquisition and Applications, pp. 41-48 (2003).
Brun, C., et al., "Learning Opinionated Patterns for Contextual Opinion Detection," Coling, pp. 165-174 (2012).
Fan, R.-E., et al., "Liblinear: A Library for Large Linear Classification," J. Machine Learning Research, vol. 9, pp. 1871-1874 (2008).
Hansen, P. C. "The Truncated SVD as a Method for Regularization," BIT Numerical Mathematics, vol. 27(4) pp. 534-553 (1987).
Hu, M., et al., Mining and summarizing customer reviews. ACM SIGKDD Int'l Conf. on Knowledge Discovery & Data Mining (KDD-2004), pp. 168-177 (2004).
Kiritchenko, S., et al, "NRC-Canada-2014: Detecting Aspects and Sentiment in Customer Reviews.," Proc. $8^{th}$ Int'l Workshop on Semantic Evaluation (SemEval 2014), pp. 437-442 (2014).
Lafferty, J., et al., "Conditional Random Fields: Probabilistic Models for Segmenting and Labeling Sequence Data," Proc. 18th Int'l Conf. on Machine Learning, pp. 282-289 (2001).
Pontiki, M., et al., "Semeval-2014 task 4: Aspect based sentiment analysis," Proc. 8th Int'l Workshop on Semantic Evaluation (SemEval 2014), pp. 27-35 (2014).
Pontiki, M., et al., "Semeval-2015 Task 12: Aspect based sentiment analysis," Proc. 9th Int'l Workshop on Semantic Evaluation (SemEval 2015), pp. 486-495 (2015).
Saias, J. "Sentiue: Target and Aspect based Sentiment Analysis," Proc. 9th Int'l Workshop on Semantic Evaluation (SemEval 2015), pp. 767-771 (2015).
Toh, Z., et al.,"NLANGP: Supervised Machine Learning System for Aspect Category Classification and Opinion Target Extraction," Proc. 9th Int'l Workshop on Semantic Evaluation (SemEval2015), pp. 496-501 (2015).
Zhang, Z., et al. "ECNU: Extracting Effective Features from Multiple Sequential Sentences for Target-dependent Sentiment Analysis in Reviews," Proc. 9th Int'l, Workshop on Semantic Evaluation (SemEval2015), pp. 736-741 (2015).
Zou, H., et al., "Regularization and variable selection via the Elastic Net," J. Royal Statist. Soc., Series B., vol. 67(2), pp. 301-320 (2005).

LOOSE TERM-CENTRIC REPRESENTATION FOR TERM CLASSIFICATION IN ASPECT-BASED SENTIMENT ANALYSIS

BACKGROUND

The exemplary embodiment relates to sentiment analysis and finds particular application in connection with aspect-based sentiment analysis.

Sentiment analysis (or opinion mining) analyzes people's opinions, sentiments, evaluations, attitudes, and emotions from written text, using natural language processing. It finds uses in a variety of applications, such as in analysis of data from blogs, social media websites, and product review websites, enabling detection of customer opinions about the products and/or services of a business or other organization and may be used for making business decisions or for making recommendations to product reviewers.

The majority of current sentiment analysis approaches, attempt to detect the overall polarity of a sentence, paragraph, or text span, irrespective of the entities mentioned (e.g., laptops, battery, screen) and their attributes (e.g., price, design, quality). When a text is classified at a document level or a sentence level, the resulting classification may not provide meaningful data concerning what the opinion holder likes or dislikes about aspects of an item. If a document is positive concerning an item, for example, this clearly does not mean that the opinion holder holds positive opinions about all the aspects or features of the item. Similarly, if a document is negative it does not mean that the opinion holder dislikes everything about the item described.

Aspect-based sentiment analysis, however, aims to detect fine-grained opinions expressed about different aspects of a given entity. See, for example, M. Hu, et al., "Mining and summarizing customer reviews." ACM SIGKDD Int'l Conf. on Knowledge Discovery & Data Mining (KDD), pp. 168-167, 2004. Aspect-based sentiment analysis systems generally receive textual input (e.g., product reviews or messages from social media) discussing a particular item (e.g., a restaurant, a movie, or a new model of a mobile phone). Such a system attempts to detect the main aspects (features) of the item and to estimate the polarity expressed about these aspects (usually positive, negative, and neutral). The detection of aspects entails detecting the aspect terms common to the particular domain and then associating them with semantic categories (or topics). For example, 'value' and 'cost' may be associated with the general semantic category 'price', while 'waiter', 'staff' and 'chef' may be associated to the semantic category 'service.'

For example, given a restaurant review "The pizza was delicious, but service was slow," the aim would be to identify the different aspect terms that relate to the restaurant domain (pizza and service) about which an opinion is expressed (positive and negative, respectively), assign these terms to semantic categories (e.g., food and service), and associate them with a measure of polarity.

However, training a system for such a fine-grained task is difficult, particularly when the number of aspect categories is high. As a result, high accuracy may not always be achieved.

There remains a need for an improved system and method for aspect-based sentiment analysis.

INCORPORATION BY REFERENCE

The following references, the disclosures of which are incorporated herein by reference in their entireties, are mentioned:

U.S. application Ser. No. 14/569,899, filed Dec. 15, 2014, entitled CATEGORY AND TERM POLARITY MUTUAL ANNOTATION FOR ASPECT-BASED SENTIMENT ANALYSIS, by Caroline Brun, et al.

U.S. Pub. No. 20150120788, published Apr. 30, 2015, entitled CLASSIFICATION OF HASHTAGS IN MICROBLOGS, by Caroline Brun, et al.

U.S. Pub. No. 20140067370, published Mar. 6, 2014, entitled LEARNING OPINION-RELATED PATTERNS FOR CONTEXTUAL AND DOMAIN-DEPENDENT OPINION DETECTION, by Caroline Brun.

U.S. Pub. No. 20130218914, published Aug. 22, 2013, entitled SYSTEM AND METHOD FOR PROVIDING RECOMMENDATIONS BASED ON INFORMATION EXTRACTED FROM REVIEWERS' COMMENTS, by Anna Stavrianou, et al.

U.S. Pub. No. 20130097174, published Apr. 18, 2013, entitled CALCULATING VALENCE OF EXPRESSIONS WITHIN DOCUMENTS FOR SEARCHING A DOCUMENT INDEX, by Livia Polanyi, et al.

U.S. Pub. No. 20130096909, published Apr. 18, 2013, entitled SYSTEM AND METHOD FOR SUGGESTION MINING, by Caroline Brun, et al.

U.S. Pub. No. 20120245924, published Sep. 27, 2012, entitled CUSTOMER REVIEW AUTHORING ASSISTANT, by Caroline Brun.

U.S. Pub. No. 20120245923, published Sep. 27, 2012, entitled CORPUS-BASED SYSTEM AND METHOD FOR ACQUIRING POLAR ADJECTIVES, by Caroline Brun.

U.S. Pub. No. 20110099052, published Apr. 28, 2011, entitled AUTOMATIC CHECKING OF EXPECTATION-FULFILLMENT SCHEMES, by Caroline Brun, et al.

U.S. Pat. No. 7,058,567, issued Jun. 6, 2006, entitled NATURAL LANGUAGE PARSER, by Salah Aït-Mokhtar, et al.

BRIEF DESCRIPTION

In accordance with one aspect of the exemplary embodiment, a method for aspect categorization includes receiving an input text sequence. Provision is made for identifying aspect terms in the input text sequence and for identifying sentiment phrases in the input text sequence. For an identified aspect term, provision is made for identifying sentiment dependencies in which the aspect term is in a syntactic dependency with one of the identified sentiment phrases. Provision is made for identifying pseudo-dependencies from a dependency graph of the input text sequence, the dependency graph including a sequence of nodes, each of the pseudo-dependencies being between a node representing the aspect term and a node representing a semantic anchor which precedes or follows the aspect term node in the dependency graph without an intervening other aspect term. Features are extracted for the aspect term from at least one of identified sentiment dependencies and identified pseudo-dependencies. With a classifier trained to output at least one of category labels and polarity labels for aspect terms, the identified aspect term is classified based on the extracted features. Information based on the classification is output.

One or more of the steps of the method may be performed with a processor.

In accordance with another aspect of the exemplary embodiment, a system for aspect categorization includes an aspect term detection component which detects aspect terms providing for identifying aspect terms in an input text sequence. A sentiment phrase detection component detects sentiment phrases in the input text sequence. A sentiment dependency extraction component identifies sentiment dependencies in which an identified aspect term is in a syntactic dependency with an identified sentiment phrase. A pseudo-dependency extraction component identifies pseudo-dependencies from a dependency graph of the input text sequence. The pseudo-dependencies including an aspect term and a semantic anchor that precedes or follows the aspect term in the dependency graph without an intervening other aspect term. A feature extraction component extracts features from at least one of the identified sentiment dependencies and identified pseudo-dependencies. A classifier classifies an identified aspect term based on the extracted features according to at least one of categories and polarity. A processor implements the components.

In accordance with another aspect of the exemplary embodiment, a method for training classifiers for aspect categorization includes: receiving a set of training samples in which aspect terms are labeled with a category selected from a plurality of predefined categories and with a polarity selected from a plurality of polarities. The method includes extracting sentiment dependencies and pseudo-dependencies from the training samples. Each sentiment dependency includes an aspect term in a syntactic dependency with a sentiment phrase. Each pseudo-dependency includes an aspect term and a semantic anchor which precedes or follows the aspect term in a dependency graph of the input text sequence without any intervening aspect terms. Features are extracted for each of a plurality of the aspect terms based on any sentiment dependencies and pseudo-dependencies in which the aspect term participates. At least one classifier model is learned for predicting category labels and polarity labels for an input text sequence based on the extracted features.

At least one of the extraction of sentiment dependencies and pseudo-dependencies and the extraction of features is performed with a processor.

DETAILED DESCRIPTION

A system and method for aspect-based sentiment analysis include, for a given input text string, such as a sentence, identifying aspect terms in the text string for a selected domain of interest, classifying each aspect term into one of a set of predefined aspect categories, and classifying the aspect term based on the polarity of sentiment (opinion-related) term(s), which are in a dependency relationship with the aspect term. The dependencies are selected from sentiment dependencies and pseudo-dependencies. Sentiment dependencies are a class of semantic dependencies. Pseudo-dependencies are dependencies that lack a formal syntactic or semantic dependency relationship, based on the applied grammar rules, but instead are defined by proximity of the aspect term and an anchor term (which may bear polarity and aspect category lexical information, such as sentiment phrases) in the text string.

The loose dependencies created between the aspect term and the sentiment phrase of a sematic category/polarity term in the pseudo-dependencies may be limited by specifying a number of linguistic and ordering constraints that restrict the dependencies generation, thus reducing potential noise. This allows capture of relatively long-range dependencies that are often difficult to capture with traditional approaches.

An "aspect term," as used herein, is a word or sequence of words which names a particular aspect of a target entity in the domain of interest. A "sentiment phrase" is a phrase that is identified as expressing a sentiment and includes one or more words.

Figure 1:
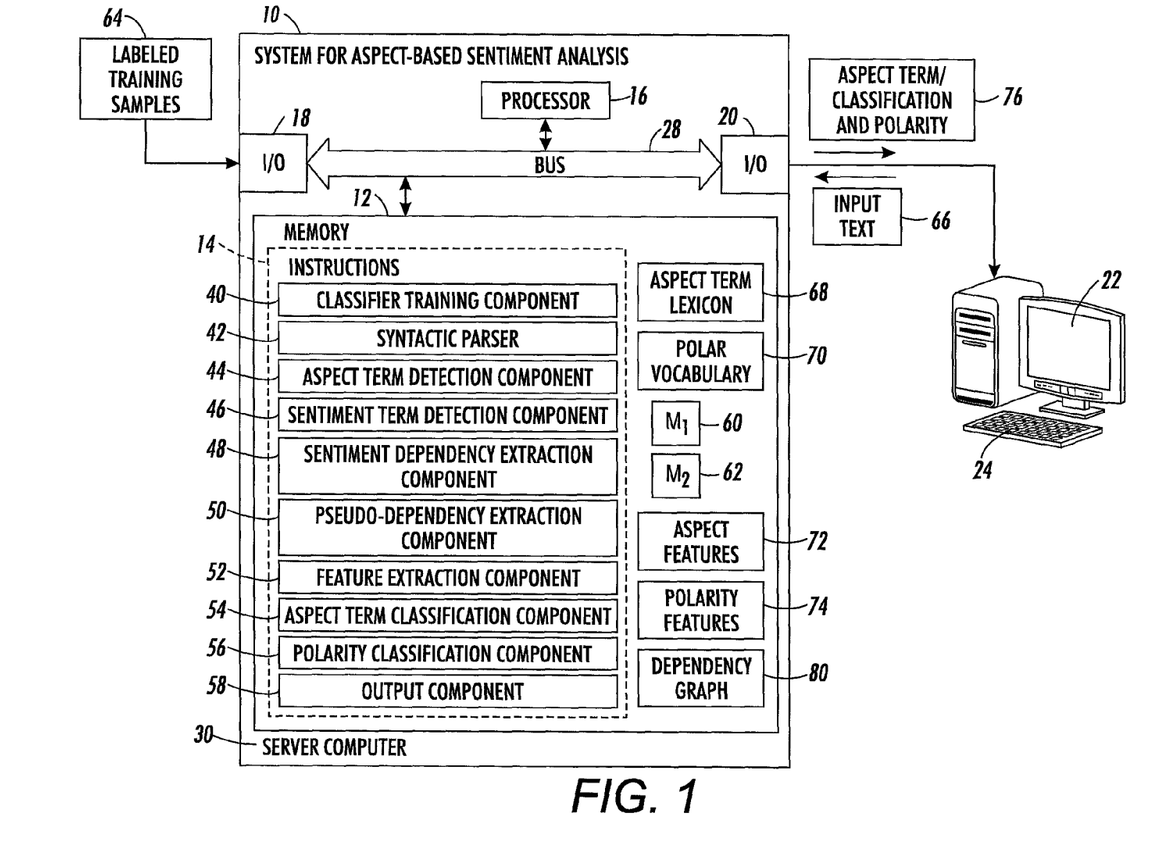
FIG. 1 is a functional block diagram of a system for aspect-based sentiment analysis, in accordance with one aspect of the exemplary embodiment.

With reference to FIG. 1, a computer-implemented system 10 for aspect-based sentiment analysis is shown. The illustrated system 10 includes memory 12, which stores software instructions 14 for performing the method illustrated in FIG. 2, and a processor 16, in communication with the memory, for executing the instructions. The system 10 also includes one or more input/output (I/O) devices, such as a network interface 18 and a user input output interface 20. The I/O interface 20 may communicate with one or more of a display device 22, for displaying information to users, speakers, and a user input device 24, such as a keyboard or touch or writable screen, and/or a cursor control device, such as mouse, trackball, or the like, for inputting text and for communicating user input information and command selections to the processor device 16. Alternatively, the system may be linked to a web server which includes a portal for receiving user comments about items in a particular domain, e.g., laptops, cell phones, books, movies, restaurants, or the like. The various hardware components 12, 16, 18, 20 of the system 10 may all be communicatively connected by a data/control bus 28.

The computer system 10 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores processed data and instructions for running the computer as well as the instructions for performing the exemplary method.

The network interface 18 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 14 include a set of components, e.g., software, including a classifier training component 40, a syntactic parser 42, a term detection component 44, a sentiment phrase detection component 46, a sentiment dependency extraction component 48, a pseudo-dependency extraction component 50, a feature extraction component 52, an aspect term classification component 54, a polarity classification component 56, and an output component 58.

Briefly, the classifier training component 40 trains classifier models 60, 62, denoted $M_1$ and $M_2$, which are used by the respective classifier components 50, 52. For training the classifier models 60, 62, a collection 64 of labeled sample sentences may be provided in a natural language, such as English or French. The classifiers are trained on features extracted from the training sentences, as described in greater detail below.

The aspect term detection component 44 detects aspect terms in input text 66 and may utilize a lexicon 68 of aspect terms for this purpose. The aim of aspect term extraction is to identify each of the aspect terms present in the sentence and label them. An aspect term names a particular aspect of a target entity. For example, in "I liked the service and the staff, but not the food", the aspect terms may be identified as service, staff, and food. Similarly, in "The food was nothing much, but I loved the staff", the aspect terms are food and staff. Multi-word aspect terms (e.g., "hard disk") are treated as single terms (e.g., in "The hard disk is very noisy" the aspect term is "hard disk").

The sentiment phrase detection component 46 detects sentiment phrases in the sentence, e.g., by accessing polar vocabulary 70 in which sentiment phrases are each associated with a respective measure of polarity.

The sentiment dependency extraction component 48 extracts sentiment dependencies, where present, between aspect terms and sentiment phrases in a sentence, e.g., using a set of parser rules. For example, the rules include rules for detecting when a sentiment phrase is in an adjectival relationship with an aspect term, i.e., the aspect term is the subject or object of an adjective that is a sentiment phrase.

The pseudo-dependency extraction component 50 extracts pseudo-dependencies between aspect terms and sentiment phrases in a sentence, e.g., based on proximity of an aspect term and a sentiment phrase in a sentence. In the exemplary embodiment, if a semantic relationship is found by the semantic dependency extraction component 48, no pseudo dependency between the two terms will be extracted by the pseudo-dependency extraction component.

The feature extraction component 52 uses the information extracted by the sentiment dependency extraction component 48 and pseudo-dependency extraction component 50 to generate features 72, 74 for input to the classifiers 54, 56. The features may be input to the classifiers in the form of a respective features-based representation, such as a vector.

The aspect term classification component 54 classifies aspect terms, based on the extracted aspect term related features 72, using the trained model 60.

The polarity classification component 56 assigns a polarity to the aspect term, based on the polarity-related features 74, using the trained model 62.

The output component 58 outputs information 76, such as the predicted category of each aspect term in the sentence 66 and its associated polarity, or information based thereon.

Figure 2:
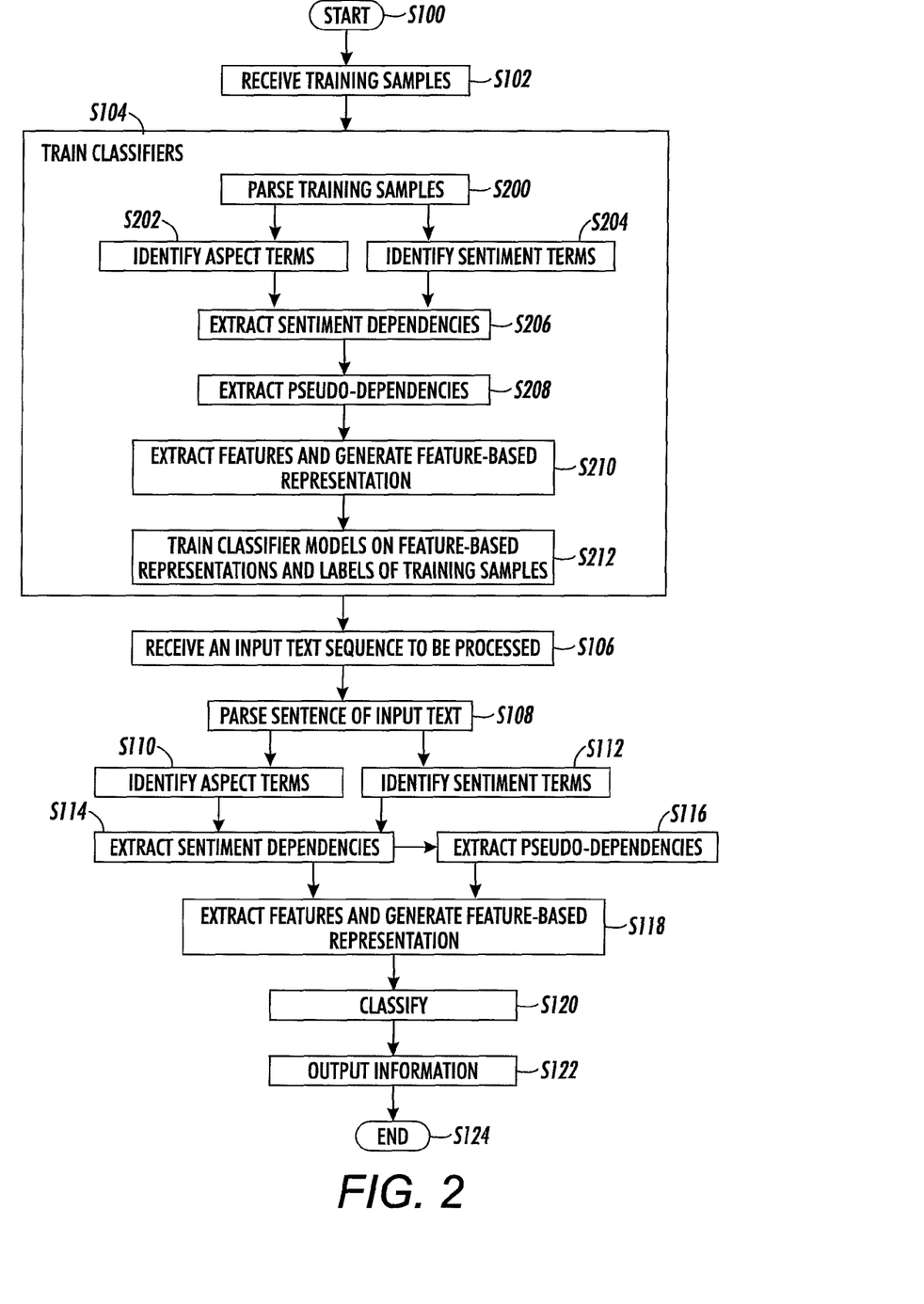
FIG. 2 is a flow chart illustrating a method for aspect-based sentiment analysis, in accordance with another aspect of the exemplary embodiment.

FIG. 2 illustrates a computer-implemented method for aspect based sentiment analysis which may be performed with the system of FIG. 1. The method starts at S100.

At S102, labeled training samples 64 are received and may be stored in system memory or remote memory.

At S104, classifier models 60, 62 are learned, by the classifier training component 40, using the labeled training samples 64.

At S106, input text 66 to be processed is received, which may include one or more sentences. The text may be stored in system memory 12 during processing.

At S108, the text is split into sentences and each sentence is parsed by the syntactic parser 42 to identify syntactic dependencies.

At S110, aspect terms are identified in the input sentence, by the aspect term detection component 44.

At S112, sentiment phrases are identified in the input sentence by the sentiment phrase detection component 46.

At S114, sentiment dependencies are extracted from the input sentence, by the sentiment dependency extraction component 48, each sentiment dependency including one of the identified aspect terms which is in a syntactic dependency with one of the sentiment phrases.

At S116, pseudo-dependencies are extracted from the input sentence, by the pseudo-dependency extraction component 50, each pseudo-dependency including one of the identified aspect terms and one of the sentiment phrases.

At S118, features are extracted for the input sentence, based on the extracted sentiment dependencies, and pseudo-dependencies, by the feature extraction component 52.

At S120, the features are used to classify each aspect term and its polarity, using the classification components 54, 56 and models 60, 62.

At S122, information is output, such as the identified aspect terms and their respective polarities.

The method ends at S124.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive of independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

Training Data

The labels for the training samples 64 may include aspect term labels. For example, each word in the sentence is labeled as either "part of an aspect term" or "null" indicating that the word is not part of an aspect term for the particular domain of interest (restaurants, in the illustrative examples used herein). Each aspect term is also labeled with a respective aspect category label corresponding to one of a predefined set of at least two aspect categories. As one example, there may be at least four, or at least six, or at least ten pre-defined aspect categories related to the domain of interest, and in some embodiments, up to 50 or up to 20 pre-defined aspect categories. Aspect categories may be hierarchical such that one or more aspect categories (topics) has at least one or at least two sub-categories (sub-topics). In the examples below, twelve pre-defined aspect categories are used which combine topics and sub-topics. Words in the sentence are also labeled with sentiment phrase labels according to whether they are "part of a sentiment phrase" or not. The identified sentiment phrases are also labeled with a polarity measure, for example, selected from among three polarity labels: positive, negative and neutral, or with values on a numerical scale ranging from highly positive to highly negative. The aspect and term labels may be in the form of XML tags, or the like.

As an example, there may be twelve categories (provided in the context of the SEMEVAL 2016 Challenge), which are a combination of topic and sub-topic, as follows:
food#quality, food#style_options, food#prices,
drinks#quality, drinks#style_options, drinks#prices,
location#general,
restaurant#general, restaurant#misc, restaurant#prices,
service#general,
ambience#general.

The "general" subtopic is used when there is only one sub-topic.

A sentence in the restaurant field (taken from the SEMEVAL 2016 Challenge), show in XML format, may be:
 <text>The spicy tuna roll is huge and probably the best that I've had at this price range.</text>

When used as a training sample 64, this sentence may be annotated in XML format with aspect terms (referred to in this example as opinion targets) and polarity, as follows, where the aspect terms are shown in bold italic, the categories in bold upper case, and the polarity in bold lower case, for ease of illustration:
 <Opinions>
  <Opinion target="spicy tuna roll"
   category="FOOD#STYLE_OPTIONS"
   polarity="positive" />
  <Opinion target="spicy tuna roll"
   category="FOOD#QUALITY" polarity="positive" />
  <Opinion target="spicy tuna roll"
   category="FOOD#PRICES" polarity="positive" />
 </Opinions>

The categories "food", "drinks" and "restaurant" can be associated with three different subcategories. As can be seen from this example, a single aspect term may be associated with more than one semantic category, such as FOOD#STYLE_OPTIONS, FOOD#PRICES, etc., and a respective polarity, which may be derived from the sentiment phrase which is in a syntactic dependency with the aspect term, such as "huge," "best", or "price."

In the exemplary method, instead of performing term detection in parallel with sentence classification in terms of topics and polarity, term detection and classification are performed for both topics and polarity.

Classifier Training (S104)

The classification components 52, 54 are trained with the labeled training samples 64, in particular, with features-based representations extracted from the training samples and aspect category and aspect polarity labels obtained from the labels of the training samples. The annotation of explicit aspect terms may thus be treated as a classification task for both the semantic category of the aspect term and the polarity of the aspect term.

S104 may include parsing the training text samples 64 with the syntactic parser 42 to extract syntactic dependencies (S200), identifying aspect terms (S202) and sentiment phrases (S204) with components 44 and 46, extracting sentiment dependencies between aspect terms and sentiment phrases with component 48 (S206), extracting pseudo-dependencies between aspect terms and sentiment phrases with component 50 (S208), and extracting aspect category and aspect polarity features 72, 74 from the labeled training samples with the feature extractor (S210) based on the extracted dependencies. Steps S200-S210 may be performed as for steps S108-S118, which are described in further detail below. 62

At S212, the classifier model 60 is trained with the aspect category features 72 extracted at S210 and the aspect category labels provided with the training samples and the classifier model 62 is trained with the aspect polarity features 72 extracted at S210 and the aspect polarity labels provided with the training samples. Two different classifier models useful as models 60, 62 are suggested by way of example and are used in the Examples described below:

Model 1: Logistic regression. A tool for performing this is available from the Liblinear classification library. See, R.-E. Fan, et al., "LIBLINEAR: A Library for Large Linear Classification," J. Machine Learning Research 9, pp. 1871-1874 (2008). The appendices of this paper give the implementation details of the LIBLINEAR classifier.

Figure 3:
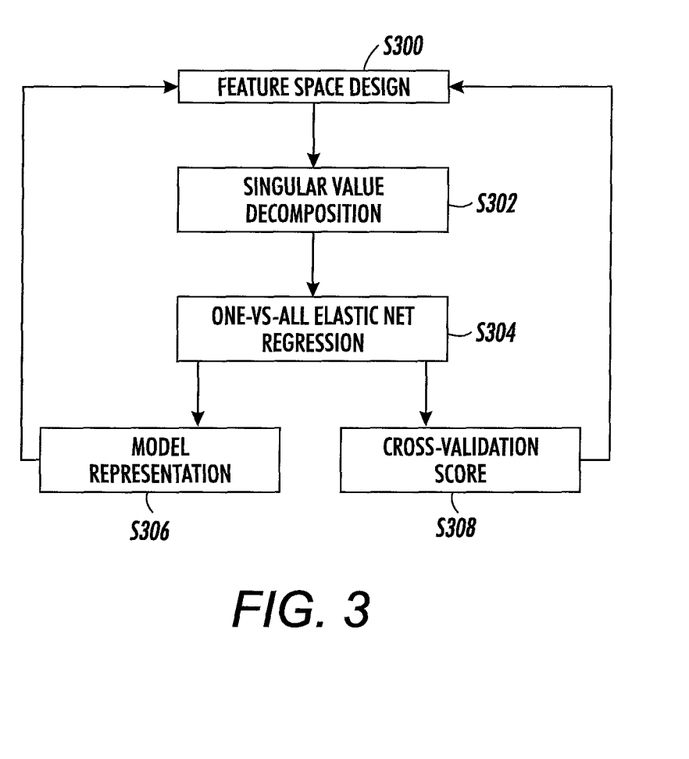
FIG. 3 shows an ensemble modeling process for aspect based sentiment analysis.

Model 2: This uses an interactive method which is able to cope with the high degree of sparsity of the data. FIG. 3 provides an example of such a model. First, the set of features associated with the considered aspect term is defined (S300). Then, in order to cope with sparsity, truncated singular value decomposition can be performed on the original set of features (S302). See, e.g., P. C. Hansen, "The Truncated SVD as a Method for Regularization," BIT Numerical Mathematics, 27 (4) 534-553, 1987. At S304, a one-versus-all Elastic Net regression model is then used to infer the target concept, in the present case, category and polarity. See, Hui Zou, at al., "Regularization and variable selection via the Elastic Net," J. R. Statist. Soc., Series B., 67(2) 301-320, 2005, for a discussion of elastic nets. An advantage of the Elastic Net is that it explicitly defines a trade-off between L1-norm and L2-norm type of regularization. A model is output at S306. Cross-validation scores may also be computed (S308) in order to allow for improvement of the feature set used as decision support (method returns to S300). The decision on which features to select (or to weight more heavily in the model) may be performed manually and/or automatically (in order to reduce classification errors).

The training set can be relatively small, for example, a set of about 2000 sentences 64 is sufficient for training the classifier models 60, 62, as described in the examples below.

Syntactic Parsing (S108, S200)

A robust syntactic parser 42 may be used to parse the training samples 64 and input text sentences 66. An exemplary parser provides a full processing chain including tokenization, morpho-syntactic analysis, POS tagging, Named Entity Detection, chunking and extraction of syntactic dependency relations such as subject, object and modifiers between lexical nodes of a chunk tree.

Tokenization involves splitting the text into tokens (generally words), often by looking for white spaces between characters. Morpho-syntactic analysis entails identifying candidate parts of speech (POS) for each word, such as noun, verb, adjective, adverb, which may be refined to a single part of speech per word as ambiguities are resolved and the most likely POS tags are assigned. This may be performed via a combination of hand-written rules and hidden Markov Modeling (HMM). Proper nouns and Named Entities are identified and may tagged as nouns. See, for example, U.S. Pat. Nos. 6,263,335, 6,311,152, 6,975,766, and 7,171,350, and U.S. Pub. Nos. 20080319978, 20090204596, 20100082331, and 20140163951, the disclosures of which are incorporated herein by reference. Chunking allows words to be grouped around a head to form noun phrases, adjectival phrases, and the like. Extraction of dependency relations (or simply dependencies) may involve extracting SUBJ relations between a noun (or more generally, a noun phrase) and a verb in which the noun phrase serves as a subject of the verb, OBJ relations between a noun phrase that serves as an object of a verb, NOUN-ATTRIBUTE and NOUN-PREDICATE dependencies, and the like.

The parser 42 may provide this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, et al., "Robustness beyond shallowness: incremental dependency parsing," in special issue of the NLE Journal (2002); U.S. Pat. No. 7,058,567; and Caroline Brun, et al., "Normalization and paraphrasing using symbolic methods," ACL: 2nd Int'l Workshop on Paraphrasing, Paraphrase Acquisition and Applications, 2003. In one embodiment, the syntactic parser 42 may be based on the Xerox Incremental Parser (XIP), which may have been enriched with additional processing rules to facilitate the extraction of aspect terms and sentiment phrases associated with them. Other natural language processing or parsing algorithms can alternatively be used. The parser can be adapted for performing other steps of the method, such as S206 and S114, through additional rules.

Aspect Term Detection (S110, S202)

Aspect terms can be nouns or noun phrases. Aspect term detection can be performed in various ways. As examples, one or more of the following two methods for aspect term spotting in the sentences 64, 66 can be used:

Method 1: Rule Based Term Detection

In this embodiment, a set of local grammar rules (e.g., based on regular expressions over syntactic categories) are provided and may be implemented by the parser 42. These rules take into account lexical semantic information collected for the domain, e.g., collected semi-automatically. These grammar rules may detect multi-words terms as well as single word terms, e.g., "pastrami sandwiches," group them under the appropriate syntactic category (such as noun, verb, adjective or other part of speech) and associate with them corresponding lexical semantic feature(s). Such a method is described in Brun, C. et al., "XRCE: Hybrid Classification for Aspect-based Sentiment Analysis," Proc. 8th Int'l Workshop on Semantic Evaluation (SemEval 2014), pp 838-842, August 2014 and in above-mentioned U.S. application Ser. No. 14/569,899.

In this method, a lexicon 68 adapted to the task and to the domain (e.g., restaurant reviews) may be employed. For example, words from the training corpus 64 are first extracted and their words encoded in the lexicon 68, optionally assigning to them semantic categories, such as in the restaurant review example, food, service, ambiance, and price. The list can then be extended with, for example, synonyms, obtained for example from a resource such as Wordnet. To improve coverage, one or more of the lists, e.g., the food term list, can be extracted and filtered from, for example, Wikipedia pages (Wikipedia Food Portal) and then encoded.

With the generated lexicon, given a new sentence 64, 66, single and multi-word terms identified by the parser are checked against the lexicon and if present, can be labeled as an aspect term and may be associated with their list of semantic categories.

Method 2: CRF-Based Term Detection

Conditional Random Fields (CRF) have been used for sequential data labeling (see, e.g., John Lafferty, et al., "Conditional Random Fields: Probabilistic Models for Segmenting and Labeling Sequence Data," Proc. 18th Int'l Conf. on Machine Learning, pp. 282-289, 2001). Such methods can be applied to term detection. CRF is a class of statistical modeling, applied in pattern recognition and machine learning. The specificity of a CRF model, compared to a more traditional classifier, is that it can take as input the combination of different samples together to make its prediction. For example, in the case of a text sequence, it can consider each word from the text as a sample that associates diverse linguistic data for that word (e.g., part of speech, lemma, number, etc.), which the CRF model then combines with the previous or the next samples (i.e., the linguistic information for the previous or the next words) from the text. The words of a sentence are thus considered as a sequence with predictions for one word impacting the predictions for surrounding words. This helps with the identification of multi-word terms.

The CRF model takes as input the features extracted by the parser for each word (such as POS tags lemma form, surface form, syntactic dependencies in which the word occurs, semantic features, such as food, drink service and other linguistic features). These features, together with those of the next and preceding words, are used to predict the most probable label for the word. The label for each word may be a binary label (belongs to aspect term or not). For the aspect terms, the label may be a more informative label for, such as a category of aspect term, e.g., food, drink, or service.

The information generated by the term detection component can be added to the rest of the information generated by the parser for use in the extraction of sentiment dependencies and pseudo dependencies.

The aspect terms extracted at this stage may be regarded as candidate aspect terms since they are only retained if a dependency with a respective sentiment phrase is identified (at S206 or S208 for the training samples, or at S114 or S116 for the input text).

While rule-based systems have been shown to perform well for this task, aspect term detection is often context-dependent, since aspect terms are annotated only when an explicit opinion is expressed about them. Thus, the CRF method may be more useful in some cases.

In some embodiments, some or all of the aspect terms in the training samples 64 are identified from their labels, rather than as described above.

Once the aspect terms in the input text 66 have been detected, they are classified into aspect categories (topics), as described in the following steps. As one example, there may be at least six, or at least 10 pre-defined topics, and in some embodiments, up to 50 or up to 20 pre-defined topics. In the examples below, 12 pre-defined topics are used.

Identification of Sentiment Phrases (S112, S204)

Sentiment phrases, such as opinion-related predicates and adjectives, may be identified using the polar vocabulary 70. The parser 42 may include a normalization component that matches words, such as verbs to their lemmatized (root) form, which in the case of verbs may be the infinitive form and in the case of nicknames, the stored name of the person. For example, the parser compares the words and phrases in the input sentence that have been tagged with the part of speech ADJ (adjective) or VERB, with the terms in the polar vocabulary 70, and any terms that are found in the polar vocabulary are tagged as sentiment phrases and may be assigned a polarity based on the assigned polarity of the respective term in the polar vocabulary 70, such as positive, negative or neutral. Methods for generating a polar vocabulary 70 which may be used herein. are described in above-mentioned U.S. Pub. No. 20120245923, published Sep. 27, 2012, entitled CORPUS-BASED SYSTEM AND METHOD FOR ACQUIRING POLAR ADJECTIVES, by Caroline Brun, the disclosure of which is incorporated herein by reference.

Some words and phrases however may be considered as polar only in certain contexts, which may be identified using specific opinion detection patterns. See, for example, U.S. Pub. No. 20140067370, published Mar. 6, 2014, entitled LEARNING OPINION-RELATED PATTERNS FOR CONTEXTUAL AND DOMAIN-DEPENDENT OPINION DETECTION, by Caroline Brun, the disclosure of which is incorporated herein by reference, for a discussion of the generation of such patterns. For example, the word vote may be treated as positive in polarity if it is in a syntactic dependency with a named entity of the type Person or Organization, otherwise it has no polarity.

In the parsing stage, dependencies of a set of predetermined type(s) may be extracted, such as NOUN-ATTRIBUTE and NOUN-PREDICATE dependencies, and normalized to form patterns. In particular, syntactic analysis by the parser extracts syntactic relationships (dependencies) between POS-labeled terms (words and/or phrases). Syntactic relations are thus found between terms which need not be consecutive and which can be spaced by one or more intervening words within the same phrase or sentence. Coreference resolution (anaphoric and/or cataphoric) can be used to associate pronouns, such as he, she, it and they with a respective noun, based on analysis of surrounding text, which need not necessarily be in the same sentence. Words of negation which are in a syntactic relation with the adjective in the expression may also be considered and used to modify (e.g., reverse) the polarity of a sentiment phrase identified from the polar vocabulary 70.

In some embodiments, some or all of the sentiment phrases in the training samples are identified from their labels, rather than as described above.

Sentiment Dependency Extraction (S114, S206)

The exemplary sentiment dependency extraction component 48 extracts semantic information about the aspect terms and their polarities. The dependency parser 42, augmented with a specific semantic component 48, thus plays the role of a feature generator for the automatic classifiers 60, 62.

The semantic extraction component 48 may be in the form of rules in the same grammar formalism as the parser rules and may operate top of the other parser rules. For this task, syntactic dependencies, lexical information about word polarities and semantic classes, and sub-categorization information may all be combined (e.g., within the parser) to extract semantic relations associated to aspect terms.

A suitable component that extracts semantic dependencies which express a sentiment, taking into account contexts and scope of the opinion-related predicates, is described, for example, in Brun, C. "Detecting Opinions Using Deep Syntactic Analysis," Proc. Recent Advances in Natural Language Processing (RANLP), Hissar, Bulgaria, Sep. 12-14, 2011, and Caroline Brun, "Learning Opinionated Patterns Detection for Contextual Opinion," Proc. COLING 2012: Posters, pp. 165-174, 2012, and U.S. Pub. No. 20140067370, published Mar. 6, 2014, entitled LEARNING OPINION-RELATED PATTERNS FOR CONTEXTUAL AND DOMAIN-DEPENDENT OPINION DETECTION, by Caroline Brun.

Each semantic dependency includes an aspect term, as identified at S110, which is in a syntactic dependency with a sentiment phrase in the sentence, as identified at S112. In the syntactic dependency, the aspect term is either the subject or object of the sentiment phrase (attribute or predicate). Lexical semantic information related to the domain of interest (e.g., "restaurant") is also used to associate semantic classes to domain words and to the aspect term transmitted by the detection component 44.

For example, if "Service" and "people" have been detected as aspect terms at S112, the sentiment dependency extraction component 48 may extract the following dependencies on the following example sentence:

"Service was slow but people were friendly."

| | |
|---|---|
| NUCL_SUBJCOMPL(WERE,FRIENDLY) | SUBJ-N_PRE(WAS,SERVICE) |
| NUCL_SUBJCOMPL(was,slow) | SUBJ-N_PRE(were,people) |
| MAIN(was) | PAST(was) |

-continued

PAST(were)
ATTRIB(people,friendly)
ASPECTTERM_SERVICE(Service)
SENTIMENT_POS(service,slow)
0>TOP{NP{Service} FV{was} AP{slow}, SC{BG{but} NP{the people} FV{were}} NP{friendly} .}.

ATTRIB(Service,slow)

ASPECTTERM_SERVICE(people)
SENTIMENT_POS(people,friendly)

The sentiment dependency extraction component 48 thus adds semantic information to a syntactic dependency between the identified aspect term and a sentiment phrase.

Extraction of Pseudo-Dependencies (S116, S208)

The term-centric feature representation provided by the sentiment dependency extraction component 48 is extended with high-recall-but-low-precision "loose" dependencies that aim to capture (1) long distance dependencies, (2) cataphoric relations, and (3) multiple semantic categories and opinions associated to ambiguous terms. The aim is to link aspect terms with semantic and polarity "anchor" nodes in a dependency graph, under a certain number of linguistic constraints, in order to generate potential decision features to help to classify the aspect terms. Like the sentiment dependencies, these include a head (an aspect term) and one or more arguments, but in this case, the arguments are semantic anchor terms and are not required to be in a syntactic dependency with the head.

Figure 4:
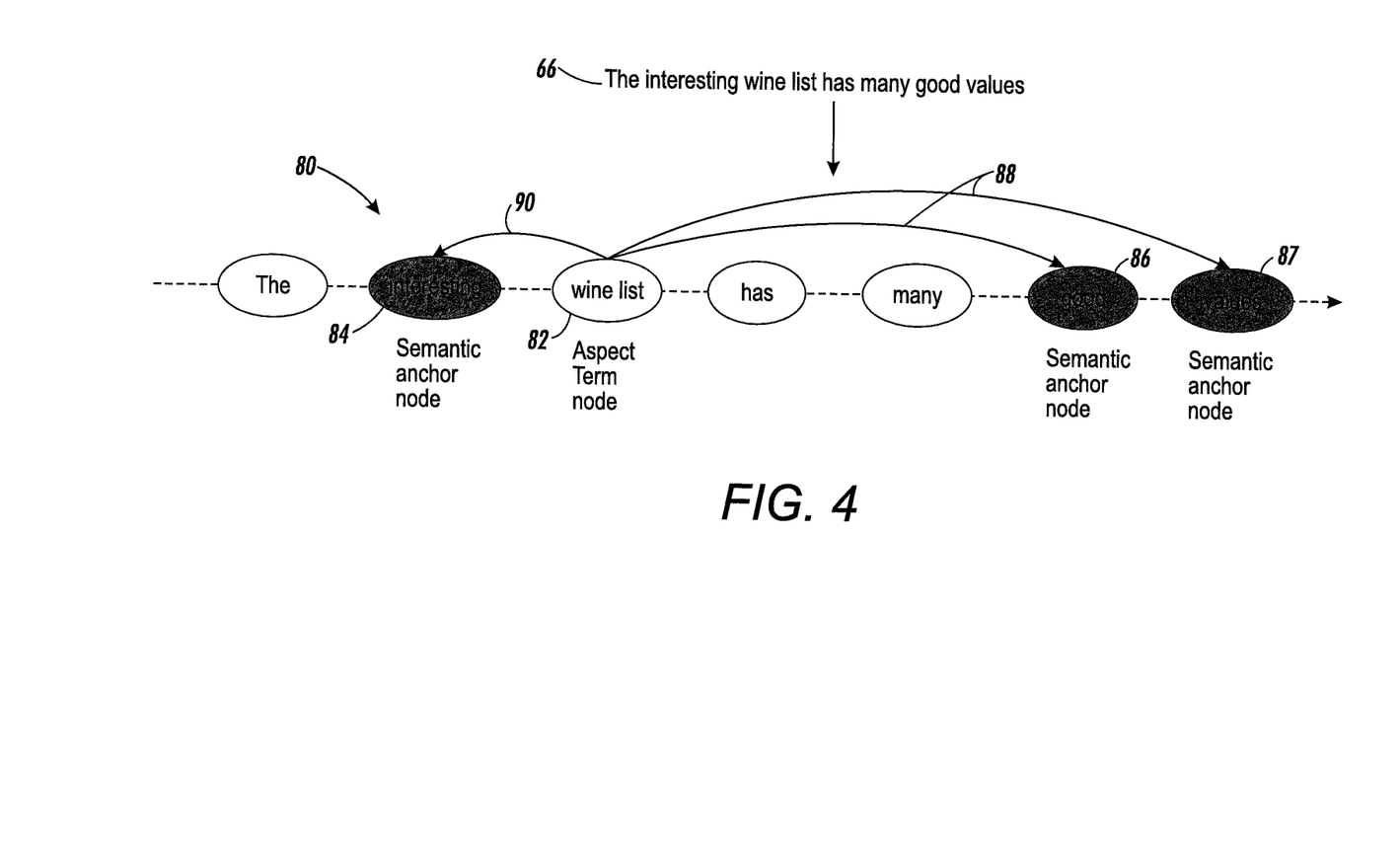
FIG. 4 illustrates a dependency graph for pseudo-dependency extraction.

As illustrated in FIG. 4, a dependency graph 80 is generated for an input sentence 66. A dependency graph is a flattened representation of the sentence as a sequence of nodes. The nodes need not be in exactly the same order as the corresponding words appear in the sentence, but follow the same general pattern. The dependency graph includes aspect term nodes 82 and semantic anchor nodes 84, 86, 87. The aspect term nodes represent aspect terms (exclusively single word nouns or multi-word nouns). The semantic anchor nodes are non-aspect term nodes, which include one or more of:

a. Nodes with lexical semantic information about categories (food, drink, price, restaurant, ambience location) and/or subcategories (general, price, style), such as sentiment phrase node 87;

b. Nodes with polarity information (positive, negative or neutral), such as nodes 84 and 87, c. Nodes with both categories/subcategories and polarity.

Aspect term nodes 82 may each be linked to one or more of the semantic anchor nodes 84, 86 (and vice versa), by links 88, 90 (shown as arcs). The links can be forward links 88, in which case the aspect term node precedes the semantic anchor node, or backward links 90, in which case the semantic anchor node precedes the aspect term node in the dependency graph. The forward and backward links take into account the order of the words in the chunking tree created from the input sentence and linguistic constraints on the dependency graph in order to link domain terms. Linguistic constraints take into account syntactic information, such as negation on an anchor node, and/or the fact that the aspect term is already in semantic relation with a sentiment phrase (these are sentiment dependencies identified in S114).

The links 88, 90 generate pseudo-dependencies that capture semantic and polarity information. The links encode linguistic patterns as follows:

Forward links: these encode relations between a domain aspect term and all following semantic anchor nodes, as long as there is no aspect term node in between and if and only if the anchor node is not in a semantic relation with another sentiment phrase, as determined previously by the sentiment dependency extraction component 48. Syntactic negation is taken into account by inverting the polarity.

Backward links: these encode relations between the last previous semantic anchor node and a domain aspect term, if and only if the anchor node is not in a semantic relation with another aspect term, and the domain aspect term is not in a semantic relation with another anchor node, as determined by the sentiment dependency extraction component 48. Syntactic negation is taken into account to invert polarity. In some embodiments, backward links are not created for an aspect term node when the semantic anchor node to which they would be linked is already linked to another term node, e.g., by a forward link.

Figure 5:
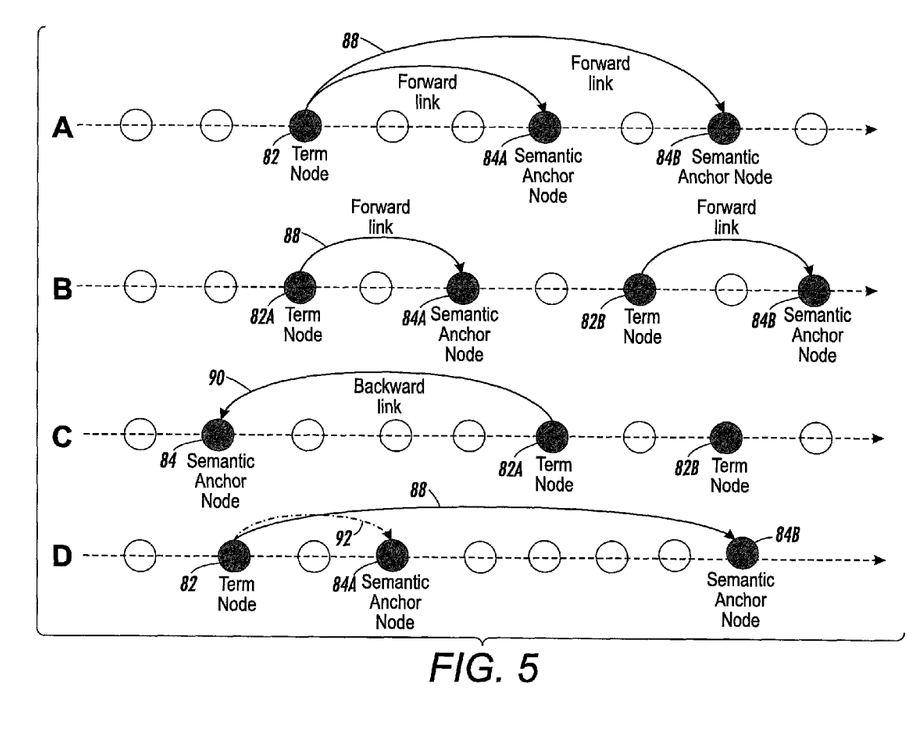
FIG. 5 illustrates various cases of pseudo-dependency extraction.

FIG. 5 illustrates example dependency graphs 80 in which these rules are applied. In Example A, two forward links 88 create pseudo-dependencies between an aspect term node 82 and respective anchor nodes 84A and 84B. In Example B, the first aspect term node 82A is only connected to one of the anchor nodes 84A, since the there is another aspect term node before the next anchor node 84B. The term node 82B has not been connected to anchor node 84A by a backward link, since it is already connected to term node 82A, but such a link is not excluded in some embodiments. In Example C, no backward dependency is generated between aspect term node 82B and anchor node 84 since there is an intervening aspect term node 82A. Example D illustrates the case where a sentiment dependency 92 has previously been generated between nodes 82 and 82A (at S114). The long-range pseudo-dependency 88 to node 84B, not identified by the parser, can then be added at S116. The created loose dependencies inherit the semantic and polarity information of the nodes they are linking.

These patterns, which are applied by the illustrated pseudo-dependency extraction component 50, may, in practice, be integrated into the rules of the parser 42, together with the rules implemented by the sentiment dependency extraction component 48. All semantic features (related to category and polarity) attached to the different nodes can be migrated to on the output pseudo-dependency.

Some of the dependencies extracted are thus neither syntactic dependencies nor semantic dependencies (syntactic dependencies with added constraints), but they encode potential interesting semantic information describing the terms in the sentences. The following examples, where domain terms are in bold and the anchor node underlined.

a) We, there were four of us, arrived at noon—the place was empty—and the staff acted like we were imposing on them and they were very rude. ForwardLink[service, negative](staff,very rude)

b) The wine list is interesting and has many good values. ForwardLink[drinks, quality, positive](wine list, interesting) ForwardLink[drinks, price, positive](wine list, good values)

c) The chicken lollipop is my favorite, most of the dishes, (I have to agree with another reviewer) are quite oily and very spicy, especially the chilly chicken. ForwardLink[positive, food, quality](chicken lollipop, favorite) ForwardLink[negative, food, quality](dishes, quite oily and very spicy) BackwardLink[negative, food, quality](chilly chicken, quite oily and very spicy)

In a), the output link captures a very long distance dependency, overcoming the problem of coreference linking. In b) the output links capture the semantic ambiguity expressed on the domain term; it is a case of multiple annotation. In c) the second relation links the term and its attribute regardless of the interpolated clause in between, and the third relation capture the inversion of the modifier and the term.
Examples of Linguistic Patterns Encoding Pseudo-Dependencies The following semantic features are defined:
Polarity: {positive, negative, neutral}
Aspect: {food, restaurant, drink, service, ambience, location}
Subtype: {general, price, style}
Semantic anchor nodes carry one or more of these features. Aspect terms (node TERM) are characterized by the semantic feature "term", and anchor (node ANCHOR) with the feature "anchor".

Negation on a feature or a constraint is denoted with "¬ ", ? denotes any node in the chunk tree, * is the Kleene star, ! denotes the feature percolation from a node to a node or to a dependency.

Negation(X) is the syntactic negation; Sentiment is a sentiment dependency;

Illustrative patterns for extracting the pseudo-dependencies can be schematized as:
FORWARDLINK:
?*, TERM[!aspect], ?*[¬ term], ANCHOR[!polarity, !aspect, !subtype], ?*
  If: ¬ NEGATION(ANCHOR) and ¬ SENTIMENT (ANCHOR, ?)
  FORWARDLINK(TERM,ANCHOR)
?*, TERM[!aspect],?*[¬ term], ANCHOR[positive, !aspect, !subtype],?*
  If: NEGATION(ANCHOR) and ¬ SENTIMENT(ANCHOR, ?)
  FORWARDLINK[negative](TERM,ANCHOR)
?*, TERM[!aspect],?*[¬ term], ANCHOR[negative, !aspect, !subtype], ?*
  If: NEGATION(ANCHOR) and ¬ SENTIMENT(ANCHOR, ?)
  FORWARDLINK[positive](TERM,ANCHOR)
BACKWARDLINK:
?*, ANCHOR[!aspect, !subtype, !polarity, ?*[¬ term, ¬ anchor], TERM[!aspects], ?*
  If: ¬ NEGATION(TERM) and ¬ SENTIMENT (TERM, ?)
  BACKWARDLINK(ANCHOR, TERM)
?*, ANCHOR[!aspect, !subtype, positive, ?*[¬ term, anchor], TERM[!aspects], ?*
  If: NEGATION(TERM) and ¬ SENTIMENT(TERM, ?)
  BACKWARDLINK [negative] (ANCHOR, TERM)
?*, ANCHOR[!aspect, !subtype, negative, ?*[¬ term, ¬ anchor], TERM[!aspects], ?*
  If: NEGATION(TERM) and ¬ SENTIMENT(TERM, ?)
  BACKWARDLINK [positive] (ANCHOR, TERM)

As will be appreciated, these patterns tend to overgenerate links and also not be linguistically sound. However, since the information generated is used in combination with the information provided by the parser as input to the machine learning classification models, these classification models can be relied on to select the appropriate decision features and overcome problems related to the high-recall-low-precision characteristic of these patterns.

Feature Extraction (S118)

For aspect term classification, it is advantageous to have a fairly precise extraction of features that are relevant for a given aspect term in a given sentence, knowing that several aspect terms can be present in the same sentence. A term-centric feature extraction method may be used. For example, for a given aspect term, the features extracted for aspect category classification may include some or all:

Lexical semantic features associated with the aspect term by the parser, (e.g., FOOD, SERVICE . . . );
n-grams (e.g., bigrams and/or trigrams) involving the aspect term and at least one immediately following and/or preceding word; and
Syntactic dependencies involving the aspect term.

In the exemplary embodiment, an aspect term, serving as a node in the dependency graph 80, is represented by the information captured by the arcs connecting this specific node to other nodes of the graph (i.e., incorporating information from both sentiment dependencies 92 and pseudo-dependencies 88, 90.

For polarity classification of aspect terms, the features can be those used for category classification but may be generalized by delexicalizing the term by replacing it with its semantic category (e.g., "staff" is replaced with "term_service") and bigram containing it (great, staff) is replaced by (great, term_service).

Aspect Term Category and Polarity Classification (S120)

The aspect terms are classified in terms of category, for example, among twelve categories by using the trained classifier model 60, to predict category labels using the extracted aspect category features 72.

The aspect terms are then classified, based on the polarity features 74, by the trained classifier model 62 in terms of polarity, for example, among three polarity labels: positive, negative or neutral, although different numbers of labels are contemplated.

The system and method may find application in various contexts, such as social media analytics projects, in particular in the context of customer care, for sentiment analytics including "aspect based" emotion detection.

The exemplary method addresses explicit aspect terms, i.e., terms which are explicitly mentioned in the sentence. The case of implicit terms can be covered by classification at sentence level.

Without intending to limit the scope of the exemplary embodiment, the following examples illustrate the application of the method.

EXAMPLES

A prior method for term correction is described in above-mentioned U.S. application Ser. No. 14/569,899, which was designed in the context, of the SemEval2014 challenge (Maria Pontiki, et al., "Semeval-2014 Task 4: Aspect based sentiment analysis," Proc. 8th Int'l Workshop on Semantic Evaluation (SemEval 2014), pp. 27-35, 2014.

The present method focuses on adaptations made for term classification, in the case of explicit terms. A term centric representation is used, taking into account information extracted from sentiment dependencies as well as long distance information in the sentence. This approach appears to be quite effective for the task of aspect categories and polarity classification, as shown in the following Examples.

Datasets

Training examples were taken from the Semeval 2016 dataset. In this dataset, only terms about which an opinion is expressed are annotated. When an aspect category is expressed implicitly, without the explicit presence of an aspect term, the annotation target is "NULL". For example, in the sentence:

<text>Their sake list was extensive, but we were looking for Purple Haze, which wasn't listed but made for us upon request!</text> the aspect term Purple Haze is an explicit term and is labeled. The expression "made for us upon request" is associated with an implicit aspect term and receives category "SERVICE#GENERAL". The resulting training sample may thus be labeled as follows (using bold and italic for emphasis):

<sentence id="1053543:2">
<text> Their sake list was extensive, but we were looking for Purple Haze, which wasn't listed but made for us upon request!</text>
<Opinions>
<Opinion target="sake list" category="DRINKS#STYLE_OPTIONS" polarity="positive" from="6" to="15"/>
<Opinion target="NULL" category="SERVICE#GENERAL" polarity="positive" from="0" to="0"/>
</Opinions>
</sentence>

Another example training sample obtained from Semeval 2016 in English is as follows:
</sentence>
<sentence id="1404042:3">
<text>Cute place, nice wait staff but would never go there again.</text>
<Opinions>
<Opinion target="wait staff" category="SERVICE#GENERAL" polarity="positive" from="17" to="27"/>
<Opinion target="place" category="AMBIENCE#GENERAL" polarity="positive" from="5" to="10"/>
<Opinion target="place" category="RESTAURANT#GENERAL" polarity="negative" from="5" to="10"/>
</Opinions>
</sentence>

Table 1 shows some measures calculated on the different training sets, for the restaurant domain.

TABLE 1

Repartition of explicit, implicit and multiple annotations in the different languages

| Lang. | # sent. | # annot. Terms | # null | # explicit annot. | # terms with 1 annot. | # terms with 2 annot. | # terms with 3 annot. |
|---|---|---|---|---|---|---|---|
| English | 2000 | 1743 | 627 | 1879 | 1616 | 118 | 9 |
| French | 1738 | 1653 | 759 | 1783 | 1529 | 118 | 6 |
| Dutch | 1705 | 1219 | 572 | 1269 | 1169 | 50 | 0 |
| Russian | 3570 | 3040 | 925 | 3097 | 2987 | 52 | 2 |

In the case of the English training dataset, Table 2 shows that it contains 2000 sentences, 2506 annotated targets, among which 627 are "Null" annotations (=topic without an explicit term). The 1879 annotations of explicit terms correspond to 1616 terms with a single annotation, 118 terms with a double annotation and 9 terms with a triple annotation. This means that 7.9% of the terms have more than one annotation and that 14% of the explicit annotations come from an ambiguous term.

Table 2 shows the repartition of type of annotation for explicit and implicit terms.

TABLE 2

Repartition of type of annotation on the English training dataset

| | Labels | annotations of explicit terms 1879 occurrences | annotations of implicit term (null) 627 occurrences |
|---|---|---|---|
| Aspect categories | food#quality | 766 | 84 |
| | food#style_options | 32 | 21 |
| | food#prices | 70 | 19 |
| | drinks#quality | 44 | 3 |
| | drinks#style_options | 32 | 0 |
| | drinks#prices | 20 | 0 |
| | location#general | 22 | 6 |
| | restaurant#general | 185 | 238 |
| | restaurant#misc | 49 | 48 |
| | restaurant#prices | 26 | 54 |
| | service#general | 324 | 125 |
| | ambience#general | 226 | 29 |
| Polarity | Positive | 1319 | 338 |
| | Negative | 488 | 263 |
| | Neutral | 72 | 26 |

Concerning explicit terms, a system as described above performs three tasks sequentially:

1. Aspect term detection in the sentences;
2. Aspect term classification into aspect categories (topics); and
3. Aspect term classification into polarity.

The classifier models described above (Model 1: Logistic regression and Model 2: an interactive ensemble method pipeline) were evaluated.

Feature extraction for the aspect terms was performed as described above, using a) Lexical semantic features associated to the term by the parser; b) Bigrams and trigrams involving the term; and c) All syntactic dependencies involving the term.

For polarity classification, features are generalized by replacing the term by its semantic category (e.g., "staff" is replaced with "term_service").

For example, for the sentence: "Patroon features a nice cigar bar and has great staff.", the system extracts the following features:

For example, for the sentence: "Patroon features a nice cigar bar and has great staff." the system may extract the features shown in Table 3:

TABLE 3

Feature Extraction Example for Aspect Category and Polarity Classification

| Aspect Term | Features for Aspect Category Classification | Features for Polarity Classification |
|---|---|---|
| "cigar bar" | cigar bar Ambience#general; bigram(cigar bar, and); bigram(nice, cigar bar); trigram(cigar bar, and, have); trigram(a, nice, cigar bar); head(cigar bar, bar); sentiment(cigar bar, nice); positive(cigar bar), obj-n(cigar bar, feature), qualif(nice, cigar bar) | Ambience#general; bigram(term_ambience, and); bigram(nice, term_ambience); trigram(term_ambience, and, have); trigram(a, nice, term_ambience); head(term-ambience, bar); sentiment(term_ambience, nice); positive(term_ambience), obj-n(term_ambience, feature), qualif(nice, term_ambience) |

TABLE 3-continued

Feature Extraction Example for Aspect
Category and Polarity Classification

| Aspect Term | Features for Aspect Category Classification | Features for Polarity Classification |
|---|---|---|
| "staff" | Staff<br>Service#general;<br>bigram(great, staff);<br>trigram(have, great, staff);<br>head(staff, staff);<br>obj-n(staff, have);<br>qualif(great, staff);<br>sentiment(staff, great),<br>positive(staff) | Service#general;<br>head(term-service, staff);<br>bigram(great, term_service);<br>trigram(have, great, term_service);<br>obj-n(term_service, have);<br>qualif(great, term_service);<br>sentiment(term_service, great),<br>positive(term_service) |

1. Evaluation without Pseudo-Dependencies

Features such as those in Table 1, are first used to train the two different classifiers but without using features obtained from pseudo-dependencies. Performances on term classification are evaluated on the English training set with 10-fold cross-validation, as shown in Table 4. In this experiment, the term detection step was skipped, as the gold standard terms are known from the training set. The classification system was applied on these known terms, in order to have a precise idea of the performances. In practice, the CRF method may be used as the first step of the processing chain.

TABLE 4

10-fold Cross-Validation results for term
classification (Categories and Polarity)

| CLASSIFICATION | ASPECT CATEGORY | POLARITY |
|---|---|---|
| Model 1 | Accuracy = 81.3 | Accuracy = 83.5 |
| Model 2 | F1 = 77.0 | F1 = 81.5 |

As will be appreciated these measures do not allow direct comparison between the two models but is useful in comparing the model improvements in Table 5 below. Looking at the results, and in particular the cross-validation errors, there are some detectable weaknesses in the term representation used to train the classifiers. For example, ambiguous terms, which have several annotations, have exactly the same feature representation for all their annotations, intrinsically because they have the same lexical semantic information, and belong to the same n-grams and dependencies. Long distance and inverted dependencies are not captured well by the parser. As will be appreciated, in traditional robust parsing, grammars are generally designed to have high precision in dependency extraction, leaving complex phenomena such as long distance dependencies or subject/object inversion unsolved, rather than providing a large set of low precision dependencies. These problems restrict the ability of the system to capture decision features for the classification models.

2. Evaluation with Pseudo-Dependencies

In this evaluation, the representation for the aspect terms is also based on pseudo-dependency-based features.

The same processing chain described above was used, but now including the new term representation on the English training data. The same 10-fold cross-validation settings are used to evaluate the performances of the classification system on aspect categories and polarities. Table 5 shows the results obtained.

TABLE 5

10-fold Cross-Validation results for term
classification (Aspect categories and Polarity)

| CLASSIFICATION | ASPECT CATEGORY | GAIN | POLARITY | GAIN |
|---|---|---|---|---|
| Model 1 | Accuracy = 87.1 | +5.8 | Accuracy = 84.6 | +1.1 |
| Model 2 | F1 = 86.0 | +9.0 | F1 = 82.5 | +1.0 |

These results show significant improvement of the performances over the results in Table 4, as shown by the improvement gain in the performance measures, and seems to be particularly significant for term aspect category classification.

The exemplary system and method, which provide a combination of machine learning classification techniques with a component outputting 'loose' semantic relations, is particularly useful for addressing the problem of aspect category and aspect polarity classification. The loose semantic relations (pseudo-dependencies) have the advantage of being able to link an aspect term with semantic information that goes beyond syntactic dependencies; in particular they can capture long distance dependencies (in an approximate way). The gain in performance demonstrates that this representation improves the classifier decisions, even if the symbolic patterns are over-generating (low precision, high recall).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for aspect categorization comprising:
    receiving an input text sequence;
    providing for identifying aspect terms in the input text sequence;
    providing for identifying sentiment phrases in the input text sequence;
    for an identified aspect term:
        providing for identifying sentiment dependencies in which the aspect term is in a syntactic dependency with one of the identified sentiment phrases, and
        from a dependency graph of the input text sequence, the dependency graph comprising a sequence of nodes, providing for identifying pseudo-dependencies in which a node representing the aspect term precedes or follows a node representing a semantic anchor in the dependency graph without an intervening other aspect term;
    extracting features from at least one of identified sentiment dependencies and identified pseudo-dependencies;
    with a classifier trained to output at least one of category labels and polarity labels for aspect terms, classifying the identified aspect term based on the extracted features; and
    outputting information based on the classification.

2. The method of claim 1, wherein at least one of the providing for identifying aspect terms and sentiment phrases, providing for identifying sentiment dependencies, providing for identifying pseudo-dependencies, extracting features, and classifying the identified aspect term based on the extracted features is performed with a processor.

3. The method of claim 1, wherein the semantic anchor nodes are selected from nodes with lexical semantic information about categories, nodes with polarity information, and combinations thereof.

4. The method of claim 1, wherein the providing identifying pseudo-dependencies excludes from consideration semantic anchor nodes representing semantic anchors which are identified as being in a sentiment dependency with another aspect term represented as a node in the dependency graph.

5. The method of claim 4, wherein the providing identifying pseudo-dependencies excludes from consideration backward links from the aspect term node to semantic anchor nodes representing semantic anchors where the aspect term node has been identified as being in a sentiment dependency with another aspect term represented as a node in the dependency graph.

6. The method of claim 1, wherein the extraction of features takes into account syntactic negation associated with an identified semantic anchor.

7. The method of claim 1, wherein each aspect term is a word or sequence of words which names a particular aspect of a target entity in a domain of interest.

8. The method of claim 1, wherein the providing for identifying aspect terms in the input text sequence comprises at least one of rule-based detection of aspect terms and CRF-based detection of aspect terms.

9. The method of claim 1, wherein the providing for identifying sentiment phrases in the input text sequence comprises accessing a polar vocabulary which includes a set of sentiment phrases.

10. The method of claim 1, wherein the classifier includes a first classifier for outputting category labels for aspect terms and a second classifier for outputting polarity labels for aspect terms.

11. The method of claim 10, wherein the second classifier is trained with generic features in which aspect terms are replaced by categories.

12. The method of claim 1, wherein the category labels include at least four category labels.

13. The method of claim 1, wherein the classifier includes one of a model learned by logistic regression and a model leaned using singular value decomposition of the set of features and a one-versus-all Elastic Net regression model to infer category and polarity.

14. The method of claim 1, further comprising training a first classifier for predicting category labels for aspect terms and a second classifier for predicting polarity labels for aspect terms based on features extracted from training samples labeled with category and polarity information.

15. The method of claim 14, wherein the training includes extracting sentiment dependencies and pseudo-dependencies from the training samples and generating feature-based representations of aspect terms in the training samples based on the respective extracted sentiment dependencies and pseudo-dependencies.

16. A computer program product comprising a non-transitory recording medium storing instructions, which when executed on a computer, causes the computer to perform the method of claim 1.

17. A system comprising memory which stores instructions for performing the method of claim 1 and a processor in communication with the memory which executes the instructions.

18. A system for aspect categorization comprising:
an aspect term detection component which detects aspect terms providing for identifying aspect terms in an input text sequence;
a sentiment phrase detection component which detects sentiment phrases in the input text sequence;
a sentiment dependency extraction component which identifies sentiment dependencies in which an identified aspect term is in a syntactic dependency with an identified sentiment phrase;
a pseudo-dependency extraction component which identifies pseudo-dependencies from a dependency graph of the input text sequence, the pseudo-dependencies including an aspect term and a semantic anchor preceding or following the aspect term in the dependency graph without an intervening other aspect term;
a feature extraction component which extracts features from at least one of identified sentiment dependencies and identified pseudo-dependencies;
a classifier which classifies an identified aspect term based on the extracted features according to at least one of categories and polarity; and
a processor which implements the components.

19. The system of claim 18, wherein the classifier includes a first classifier trained to predict category labels for aspect terms and a second classifier trained to predict polarity labels for aspect terms.

20. A method for training classifiers for aspect categorization comprising:
receiving a set of training samples in which aspect terms are labeled with a category selected from a plurality of predefined categories and a polarity selected from a plurality of polarities;
extracting sentiment dependencies and pseudo-dependencies from the training samples, each sentiment dependency including an aspect term in a syntactic dependency with a sentiment phrase, each pseudo-dependency including an aspect term and a semantic anchor which precedes or follows the aspect term in a dependency graph of the input text sequence without any intervening aspect terms;
extracting features for each of a plurality of the aspect terms based on any sentiment dependencies and pseudo-dependencies in which the aspect term participates;
and learning at least one classifier model for predicting category labels and polarity labels for an input text sequence based on the extracted features,
wherein at least one of the extraction of sentiment dependencies and pseudo-dependencies and the extraction of features is performed with a processor.

* * * * *